Feb. 24, 1959 E. G. RANALLO 2,874,759
BEAD SEATING AND INFLATING DEVICE FOR TUBELESS TIRES
Filed Jan. 12, 1953 2 Sheets-Sheet 1
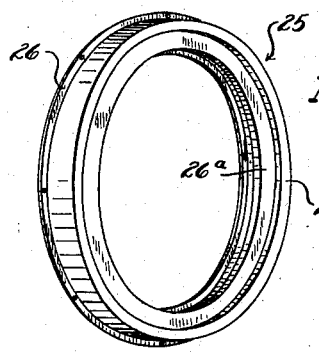
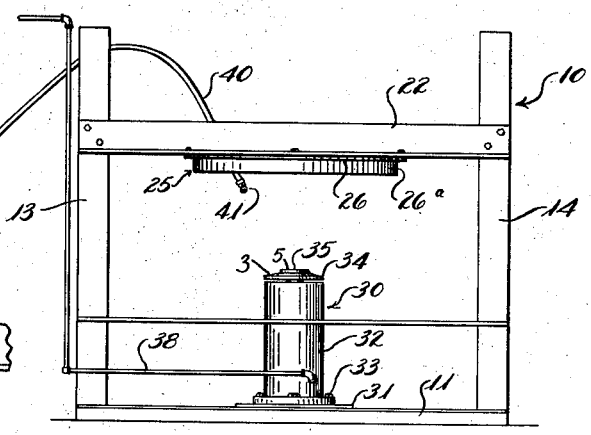
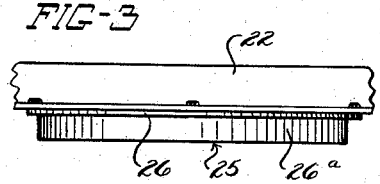
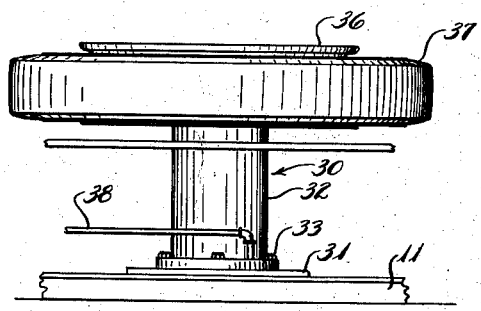
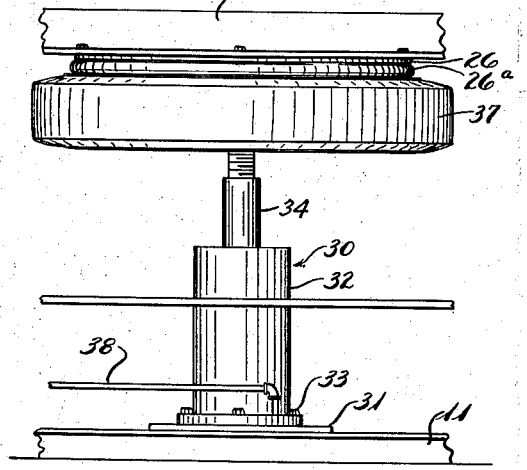
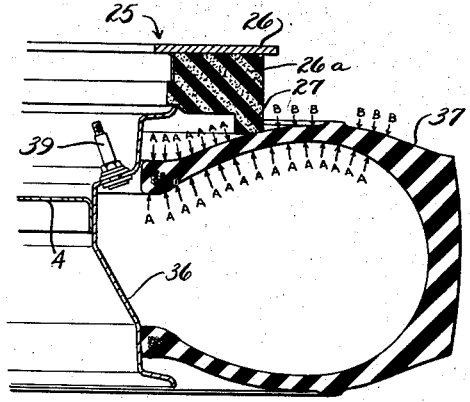
INVENTOR.
EMIL G. RANALLO
BY
W. A. Fraser
ATTY.

Feb. 24, 1959  E. G. RANALLO  2,874,759
BEAD SEATING AND INFLATING DEVICE FOR TUBELESS TIRES
Filed Jan. 12, 1953  2 Sheets—Sheet 2

INVENTOR.
EMIL G. RANALLO
BY
W. A. Fraser
ATTY-

United States Patent Office 2,874,759
Patented Feb. 24, 1959

2,874,759

BEAD SEATING AND INFLATING DEVICE FOR TUBELESS TIRES

Emil G. Ranallo, Pittsburgh, Pa., assignor to The Firestone Tire & Rubber Company, Akron, Ohio, a corporation of Ohio Application January 12, 1953, Serial No. 330,683

7 Claims. (Cl. 157—1.1)

The present invention relates to apparatus for and a method of mounting tubeless tires on their rims.

As tubeless tires have come into more general use, the mounting of the tires has presented the industry with a serious problem in that until the present invention, no satisfactory means has been found to establish the initial contact of both tire beads with their drop-center tire rim seats. In mounting, often, and in fact usually, one or both beads do not contact the rim bead seats permitting such opening therebetween that the inflation of the tire was impossible because the inflationary air escaped as rapidly as it entered the tire. Heretofore, many expedients to accomplish initial seating of the tire beads have been tried. For example, means to draw the crown of the tire radially inwardly to cause the tire beads to move laterally outwardly against the rim seats has been used. Another expedient has been to provide the tubeless tires with cardboard separators between the beads so that when the separators were removed for tire mounting, the beads would tend to stay widely separated and contact the rim bead seats all around. Mechanical separators, in the form of inflatable members between the tire beads, have been suggested as have other types of resilient members. However, as indicated above, none of these have proven entirely satisfactory.

An object of the present invention is to provide means whereby tubeless tires may be quickly mounted and inflated on their rims without modifying the conventional structure of the tire, or adding any element thereto, said means being inexpensive, highly efficient and reliable.

Another object of the invention is to provide means for mounting tubeless tires that will function properly independent of the lateral and radial clearances between the tire beads and the tire rim bead seats.

A further object is to provide means for mounting a tubeless tire that avoids the use of clamps, bars, prying members or the like that heretofore have frequently injured the tire in such way as to prevent loss of inflationary air when the tire is run in service.

Other objects and advantages of the invention will be apparent to those familiar with the art as the description proceeds.

Referring to the drawings:

Figure 1 is a perspective view of a closure member embodying the present invention;

Figure 2 is a front elevation of one embodiment of the apparatus embodied in the present invention;

Figure 3 is a fragmentary enlarged view of Figure 2 showing a tubeless tire mounted on its rim and the rim disposed on the ram of a fluid operated cylinder;

Figure 4 is the same as Figure 3, except showing the ram in raised position pressing the upper side of the tire against a closure member;

Figure 5 is a fragmentary sectional view illustrating the relative positions of the tire, rim and closure member preparatory to initiating the tire inflation, the ram having been raised just enough to cause closure member to make low pressure sealing contact with tire and rim;

Figure 6:
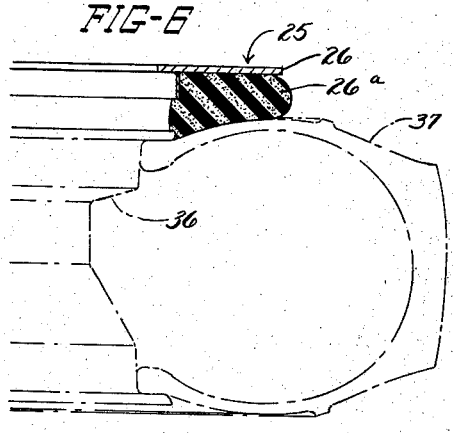
Figure 6 is a sectional view similar to Figure 5, but showing the relative position of the tire, rim and closure member at the completion of the tire inflation.

Referring more specifically to the drawings, it will be seen that the apparatus comprises a frame, referred to generally as 10, said frame having base portion 11, upright members 13, 14, and a cross member 22 bolted to said side members. A closure ring, referred to generally as 25, comprises a metallic backing plate 26 bolted to cross member 22. Backing plate 26 has attached thereto, by any means found satisfactory, as by vulcanization or cementing, a ring of resilient material, such as sponge rubber, said ring being of substantial thickness and having a main body portion 26a adapted to contact in fluid tight relation the upper edge of the side flange of a tire rim and a downwardly projecting portion 27 adapted to contact in fluid tight relation the upper side of a tire during a tubeless tire mounting operation (see Figure 5). Tire and wheel lifting means, referred to generally as 30, is mounted on base 11 and consists of a circular base 31, a cylinder 32 bolted to base 31 by means of bolts 33 passing through a radially outwardly extending flange of cylinder 32 and base 31. A ram 34 has a head 35 of a shape and size adapted to receive and support a disk type wheel and a tire rim 36 on which a tubeless tire 37 is mounted, as will be seen by further reference to the drawings. The head 35 has an axially disposed cylindrical projection 5 adapted to fit into the central opening of the disk 4 (see Fig. 7) and a shoulder 3 on which the bolt circle portion of said disk is removably supported. The ram 34 of lifting means 30 is actuated by fluid pressure such as air passing into cylinder 32 through a pipe line 38 as will be readily understood by those familiar with lifting means of the character just described.

In operation, the tubeless tire to be mounted as 37 is placed on the rim with the beads between the rim flanges in any conventional manner, after which the tire and rim is placed on the ram head 35 as illustrated in Figure 3. Next, an operator, by means of a hand valve not shown, turns fluid pressure back of the ram 34 which causes the ram to rise and carry the tire and rim upward until the upper edge of the tire rim flange and the upper side wall of the tire 37 is in air sealing contact with the sponge rubber 26a and 27 respectively. The next step is to turn inflationary air into valve stem 39 which is in fluid tight relation with said tire rim.

By reference to Figure 5, it will be seen that the weight of the tire and some additional pressure from the closure member 27 presses the lower bead of the tire into substantial contact with its bead seat. Inflationary air is supplied through an air hose 40 having an air chuck 41 communicating, when in operation, with valve stem 39 which in the present case has its passage therethrough aligned with a hole in the tire rim and the stem base is in fluid tight contact with said rim. It will now be seen by further reference to Figure 5 that as air enters the tire through valve stem 39, there is equal air pressure within the tire proper, and the chamber outside the upper tire bead portion which outside chamber is defined by the inside of a portion of rim 36, the closure member 26a, the outer surface of a portion of the tire at its bead portion. The relative air pressures on the opposite sides of the tire sidewalls is illustrated by the arrows A and B of Figure 5. Arrows B indicate atmosphere pressure on the outer surface of the sidewall and the arrows A, the progressively increasing inflationary pressure on the inner surface of the sidewall and bead portion and on the outer surface of the bead portion which lies radially inward from the contact line of the sealing member with the sidewall of the tire. The pressure on both sides of the tire bead and the sidewall radially inward from the sealing member contact with the sidewall is equal during initial inflation. However, as inflationary pressure builds up within the tire, this pressure against the inside surface of the tire as indicated by A quickly overcomes the atmospheric pressure indicated by the arrows B and the sidewall is forced axially until the bead of the tire contacts the rim. Since the weight of the tire presses the lower bead into contact with rim, it will be seen that as soon as the upper bead touches the rim, escape of air is virtually stopped and pressure within the tire forces both beads to their ultimate positions on the tire rim.

As the upper bead of the tire moves toward its tire rim bead seat, the sponge rubber of the closure member 25 compresses freely to permit such movement of the tire, the operator being careful to bring the tire and rim into such initial contact with the sponge rubber as to provide the necessary sealing, but not to eliminate the residual compression character of the sponge rubber. That is, the operator makes certain that when the initial inflationary air is turned into the tire, the sponge rubber of said closure member will still permit further compression by the movement of the tire without substantial resistance thereto.

Figure 7:
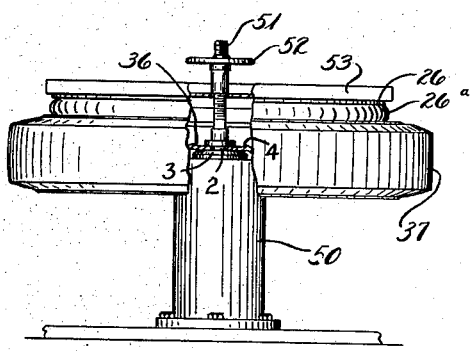
Figure 7 is a sectional view in elevation of a modified form of the invention illustrating a simplified adaptation of the invention.

The embodiment shown in Figure 7 operates essentially in the same manner as does the embodiment explained in connection with Figures 1 to 6 inclusive. However, where such raising means as shown in Figure 2 is not available, as may be the case in the establishment of small tire dealers, a stand 50, such as shown in Figure 7, may be used and a threaded bar 51, with a threaded nut or wheel 52, may be employed to press a cross member 53 downward against the backing plate 26 of the closure member, to bring it into contact with the upper portion of the tire in the same manner as was explained in connection with Figures 1 to 6. It is to be understood that in Figure 7 the same type of closure member is used as in Figure 2.

Figure 8:
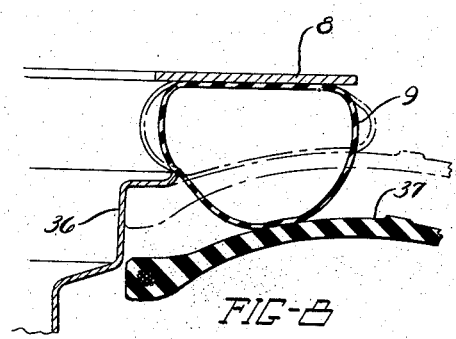
Figures 8 and 9 are views illustrating modifications of the closure member shown in Figure 1.

The embodiment of the invention illustrated in Figure 8 discloses a pneumatic tube 9 replacing the sponge rubber of the closure member shown in Figure 2. The tube is shown interposed between a backing plate 8 and the tire and rim. If found desirable, the tube may be attached to the plate in any way found satisfactory. It will be seen that the pneumatic closure member operates essentially the same as the sponge rubber, the tube, like the sponge rubber, bridging and closing the space between the edge of the rim flange and the side of the tire. It will be obvious from the above that many modifications of accomplishing a seal between the rim and the side of the tire can be devised without departing from the spirit of the present invention. For example, a portion of the backing ring itself may be used as a part of a wall defining a chamber when contact is made between the closure member and the edge of the rim and the side of the tire. It is pointed out that it is not essential that the sponge rubber or other resilient facing or pneumatic means be attached to a backing plate if such rubber or facing bridges the gap between tire and rim.

Figure 9:
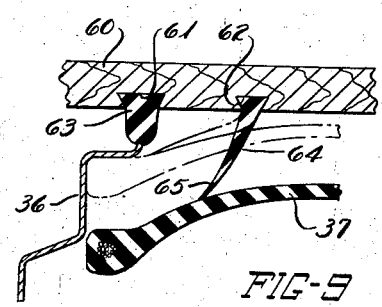

The embodiment of the sealing member illustrated in Figure 9 comprises a plate 60 having concentric grooves 61, 62 of dove-tailed shape in cross section and adapted to receive and retain, in fluid tight but removable relation, rubber or rubber-like closure members 63, 64 respectively. Members 63 and 64 may be snapped into the grooves 61 and 62 respectively. Member 63 is adapted to contact and seal at the rim flange, and member 64 is adapted to contact and seal at the sidewall of the tire as illustrated. Sealing member 64 is provided with a lip portion 65 which makes a lip seal with the sidewall of the tire. An advantage of this type of sealing member is its low cost, long life and the rather long extension of lip 65 that can be employed, if desired, to insure sufficient length to reach the sidewall of the tire.

While the operation of the invention has been explained by reference to more than one type of closure member applied to the top of a tire lying horizontally, it is to be understood that the invention is not to be limited to these sealing members alone as obviously the tire of Figure 4 could lie upon a second closure member, of the same or similar construction to that of closure member 25, if it were found desirable. Applicant has found, however, that when the tire lies substantially horizontal that the weight of the tire and the slight downward pressure of the closure member initially applied to the tire forces the lower tire bead against its rim bead seat or close enough to prevent escape of air so rapid as would interfere, to an objectionable degree, with the mounting operation. Such second ring may be used as a matter of insurance against air escaping if desired. Applicant also points out that the tire and rim may be in a vertical position, that is, with their axis horizontal, preparatory to the final step of mounting. In this latter case, it is preferred to use a sealing ring 25 on each side of the assembly, the rings being applied either manually or mechanically depending upon the volume of tires to be mounted and the speed of mounting desired. Further, applicant points out that in view of the above disclosure numerous ways of effecting a complete or partial seal between the rim and tire, such as by adhesive tapes, etc. will be apparent and that such expedients are within the spirit and contemplation of the present invention.

The detailed description of the particular embodiments of the invention illustrated and described herein is not to be construed as limiting the invention thereto. The invention includes all features of patentable novelty residing in the foregoing description and the accompanying drawings.

What is claimed is:

1. Apparatus for inflating and mounting a tubeless tire on a tire rim when one of the beads fails to make sealing contact with the corresponding rim seating surfaces, comprising a pressure-resisting member adapted to span the gap between said rim and the exterior surface of said tire sidewall including means for making sealing contact with the exterior surface of said tire, intermediate said bead and the tread portion of said tire, and with said rim to form a closed chamber including the interior of said tire, said chamber enclosing a radially inward portion of said exterior surface of said tire sidewall and leaving a substantial area of the radially outward portion of said exterior surface exposed to the atmosphere, whereby when fluid under pressure is admitted to said chamber, unbalanced fluid pressure forces are imposed on said sidewall to move said sidewall and its bead toward contact with said rim, said means being yieldable to permit said movement of said sidewall.

2. Apparatus according to claim 1 in which said means comprises a substantially air impervious annular closure sleeve extending axially from a supporting member into contact with the exterior surface of the sidewall of said tire.

3. Apparatus for inflating and mounting a tubeless tire on a tire rim when one of the beads fails to make sealing contact with the corresponding rim seating surface, comprising pressure resisting means adapted to span the gap between said rim and the exterior surface of said tire sidewall including means for making sealing contact with the exterior surface of said tire, intermediate said bead and the tread portion of said tire, and with said rim to form a closed chamber including the interior of said tire, said chamber enclosing a radially inward portion of said exterior surface of said tire sidewall and leaving a substantial area of the radially outward portion of said exterior surface exposed to the atmosphere, whereby when fluid under pressure is admitted to said chamber, unbalanced fluid pressure forces are imposed on said sidewall to move said sidewall and its bead toward contact with said rim, said last named means being yieldable to permit said movement of said sidewall.

4. A method of inflating and mounting a tubeless tire on a tire rim when one of the tire sidewalls and its bead fails to make sealing contact with the corresponding rim seating surfaces, comprising subjecting a substantial area of the radially outward portion of the exterior surface of said one sidewall to atmospheric pressure and subjecting the corresponding radially inward portion of the exterior surface of said one sidewall and the interior surface of said one sidewall to superatmospheric pressure to cause said one sidewall and bead to move toward and make sealing contact with said rim.

5. Apparatus for inflating and mounting a tubeless tire on a tire rim when one of the beads fails to make sealing contact with the corresponding rim seating surface, comprising pressure resisting means adapted to span the gap between said rim and the exterior surface of said tire sidewall, a first resilient member mounted on the axial inner surface of said pressure resisting member and adapted to contact said rim and a second resilient member mounted on the axial inner surface of said pressure resisting member and adapted to seal against the sidewall of the tire intermediate said bead and the tread portion of said tire to form a closed chamber including the interior of said tire, said chamber enclosing a radially inward portion of said exterior surface of said tire sidewall and leaving a substantial area of the radially outer portion of said exterior surface exposed to the atmosphere, whereby when fluid under pressure is admitted to said chamber, unbalanced fluid pressure forces are imposed on said sidewall to move said sidewall and its bead toward contact with said rim, said second resilient member being yieldable to permit said movement of said sidewall.

6. Apparatus for inflating and mounting a tubeless tire on a tire rim when one of the beads fails to make sealing contact with the corresponding rim seating surface, comprising pressure resisting means adapted to span the gap between said rim and the exterior surface of said tire sidewall, and a resilient sponge rubber ring mounted on said pressure resisting means for making sealing contact with the exterior surface of said tire, intermediate said bead and the tread portion of said tire, and with said rim to form a closed chamber including the interior of said tire, said chamber enclosing a radially inward portion of said exterior surface of said tire sidewall and leaving a substantial area of the radially outer portion of said exterior surface exposed to the atmosphere, whereby when fluid under pressure is admitted to said chamber, unbalanced fluid pressure forces are imposed on said sidewall to move said sidewall and its bead toward contact with said rim, said resilient ring being yieldable to permit said movement of said sidewall.

7. Apparatus for inflating and mounting a tubeless tire on a tire rim when one of the beads fails to make sealing contact with the corresponding rim seating surface, comprising a pressure resisting means adapted to span the gap between said rim and the exterior surface of said tire sidewall, a pneumatic tube mounted on said means making sealing contact with the exterior surface of said tire, intermediate said bead and the tread portion of said tire, and with said rim to form a closed chamber including the interior of said tire, said chamber enclosing a radially inward portion of said exterior surface of said tire sidewall and leaving a substantial area of the radially outer portion of said exterior surface exposed to the atmosphere, whereby when fluid under pressure is admitted to said chamber, unbalanced fluid pressure forces are imposed on said sidewall to move said sidewall and its bead toward contact with said rim, said pneumatic tube being yieldable to permit said movement of said sidewall.

References Cited in the file of this patent

UNITED STATES PATENTS

| Number | Name | Date |
|---|---|---|
| 711,212 | Honiss | Oct. 14, 1902 |
| 1,352,722 | Caldwell | Sept. 14, 1920 |
| 1,966,580 | Bull | July 17, 1934 |
| 1,980,022 | Whitehouse | Nov. 6, 1934 |
| 2,304,581 | Lyon | Dec. 8, 1942 |
| 2,370,322 | Nebesar | Feb. 27, 1945 |
| 2,406,771 | Hughes | Sept. 3, 1946 |
| 2,418,849 | Polt | Apr. 15, 1947 |
| 2,442,714 | Stack | June 1, 1948 |
| 2,615,506 | Wilson | Oct. 28, 1952 |

FOREIGN PATENTS

| 506,780 | Great Britain | June 5, 1939 |